(12) United States Patent
Turato

(10) Patent No.: US 12,008,907 B2
(45) Date of Patent: Jun. 11, 2024

(54) CONNECTED USER COMMUNICATION AND INTERFACE SYSTEM WITH MOBILE SECURITY AND WIRELESS ACCESS POINT DEVICES

(71) Applicant: AVIS BUDGET CAR RENTAL, LLC, Parsippany, NJ (US)

(72) Inventor: John Turato, Parsippany, NJ (US)

(73) Assignee: AVIS BUDGET CAR RENTAL, LLC, Parsippany, NJ (US)

( * ) Notice: Subject to any disclaimer, the term of this patent is extended or adjusted under 35 U.S.C. 154(b) by 1291 days.

(21) Appl. No.: 15/986,504

(22) Filed: May 22, 2018

(65) Prior Publication Data
US 2019/0027043 A1 Jan. 24, 2019

Related U.S. Application Data

(60) Provisional application No. 62/538,537, filed on Jul. 28, 2017, provisional application No. 62/509,599, filed on May 22, 2017.

(51) Int. Cl.
*G08G 1/00* (2006.01)
*G06Q 10/02* (2012.01)
(Continued)

(52) U.S. Cl.
CPC ............ *G08G 1/205* (2013.01); *G06Q 10/02* (2013.01); *G07C 5/006* (2013.01); *G07C 5/008* (2013.01);
(Continued)

(58) Field of Classification Search
CPC .. G07C 5/008; G07C 9/00563; G07C 5/0808; G07C 5/02; G07C 5/0816; G07C 5/0858;
(Continued)

(56) References Cited

U.S. PATENT DOCUMENTS 3,761,865 A * 9/1973 Bomgaars ............. H01R 13/58
256/10
8,259,707 B2 9/2012 Cotton et al.
(Continued)

OTHER PUBLICATIONS

International Search Report and Written Opinion, PCT/US18/033916, Avis Budget Car Rental, LLC (international filing date May 22, 2018).
(Continued)

*Primary Examiner* — Golam Sorowar
(74) *Attorney, Agent, or Firm* — Wayne Edward Ramage; Baker Donelson

(57) ABSTRACT

A system and related methods for management of communications and interfacing between a user and a connected fleet of vehicles, including a system for providing mobile security devices and/or mobile wireless access point devices at a fleet facility. The system provides easy and rapid movement of wire access point devices/antennae, security cameras, or both, within a rental or fleet facility. One or more support wires extend between connection points within the facility. The connection points may be fixed or moving (i.e., the connection point itself may be on a track or similar device, and thus be movable from point to point along the track). Trolleys supporting one or more security cameras, wireless access point devices, or similar devices, move along the support to desired locations.

12 Claims, 8 Drawing Sheets

(51) Int. Cl.
*G07B 15/00* (2011.01)
*G07C 5/00* (2006.01)
*H01Q 3/02* (2006.01)
*H04W 4/44* (2018.01)
*H04W 84/00* (2009.01)

(52) U.S. Cl.
CPC ............... *G07B 15/00* (2013.01); *H01Q 3/02* (2013.01); *H04W 4/44* (2018.02); *H04W 84/005* (2013.01)

(58) Field of Classification Search
CPC .. G07C 5/08; G07C 9/00896; G07C 9/00912; G07C 9/00309; G07C 9/00571; G07C 2009/00523; G07C 9/22; G07C 9/21; G07C 9/32; G07C 2009/00531; G07C 2009/00539; G07C 3/00; G07C 9/27; G07C 9/28; H04W 4/40; H04W 4/80; H04W 4/46; H04W 4/44; H04W 4/021; H04W 84/005; H04W 12/06; H04W 12/02; H04W 12/03; H04W 12/04; H04W 4/029; H04W 4/06; H04W 4/185; H04W 4/50; H04W 84/18; H04W 4/38; H04W 84/12; H04W 4/023; H04W 24/02; H04W 24/08; H04W 4/02; H04W 88/10; B60R 25/102; B60R 1/00; B60R 11/04; B60R 2011/0003; B60R 2011/004; B60R 2300/30; B60R 2300/804; B60R 2325/105; B60R 25/2081; B60R 2325/205; B60R 25/305; B60R 16/0231; B60R 2325/101; B60R 2325/302; B60R 2325/304; B60R 25/00; B60R 25/1012; B60R 25/33

See application file for complete search history.

(56) References Cited

U.S. PATENT DOCUMENTS

| | | | |
|---|---|---|---|
| 9,567,952 | B2 | 2/2017 | Nishimura et al. |
| 9,616,896 | B1 | 4/2017 | Letwin et al. |
| 11,054,841 | B2 | 7/2021 | Turato |
| 11,782,455 | B1 | 10/2023 | Turato |
| 2002/0184062 | A1 | 12/2002 | Diaz |
| 2003/0158656 | A1 | 8/2003 | David |
| 2004/0010338 | A1 | 1/2004 | Ogura et al. |
| 2005/0203683 | A1 | 9/2005 | Olsen et al. |
| 2011/0309996 | A1 | 12/2011 | Abumrad et al. |
| 2013/0088194 | A1* | 4/2013 | Hunter ............... H02J 50/12 320/108 |
| 2013/0257373 | A1* | 10/2013 | Mallon, IV ............ F16L 3/16 248/65 |
| 2014/0062804 | A1* | 3/2014 | Abumrad ............. H01Q 1/42 343/702 |
| 2016/0093216 | A1 | 3/2016 | Lee et al. |
| 2016/0347293 | A1 | 12/2016 | Chen et al. |

OTHER PUBLICATIONS

International Search Report and Written Opinion, PCT/US18/033879, Avis Budget Car Rental, LLC (international filing date May 22, 2018).

\* cited by examiner

CONNECTED USER COMMUNICATION AND INTERFACE SYSTEM WITH MOBILE SECURITY AND WIRELESS ACCESS POINT DEVICES

This application claims benefit of and priority to U.S. Provisional Application Nos. 62/509,599, filed May 22, 2017, and 62/538,537, filed Jul. 28, 2017, and is entitled to the benefit of those filing dates. The specifications, drawings, appendices and complete disclosures of U.S. Provisional Applications No. 62/509,617, filed May 22, 2018, No. 62/509,599, filed May 22, 2018, and No. 62/538,537, filed Jul. 28, 2017, are incorporated herein in their entireties by specific reference for all purposes.

FIELD OF INVENTION

This invention relates to a system and related methods for management of communications and interfacing between a user and a connected fleet of vehicles. More particularly, this invention relates to a system and related methods for providing a system with mobile security devices and mobile wireless access point devices.

SUMMARY OF INVENTION

In several embodiments the present invention comprises a unique, single integrated platform for communications between a connected user and a connected fleet management system. The connected fleet management system manages fleet planning, in-fleeting operations, vehicle acquisition and provisioning, vehicle assignment, vehicle transfers (i.e., to another fleet or another component fleet in the larger fleet), vehicle use operations (i.e., reservations, use and return by a customer, member, driver or user), vehicle servicing, vehicle maintenance and repairs, and de-fleeting operations (e.g., removal of the vehicle from the fleet, return to manufacturer, or sale to third parties).

Within this context, the system provides a variety of user-facing applications and interfaces, including applications which may be installed and run on a mobile computing device of the user for various functions. These functions include, but are not limited to, user registration or enrollment, user reservation management, user access to a fleet vehicle, communication between the user and the fleet management system during use (including, but not limited to, providing roadside or emergency assistance), and return of the fleet vehicle.

In several exemplary embodiments, the present invention comprises a system for the easy and rapid movement of wire access point devices/antennae, security cameras, or both, within a rental or fleet facility. The system comprises one or more support wires, each wire extending between connection points within the facility. The connection points may be fixed or moving (i.e., the connection point itself may be on a track or similar device, and thus be movable from point to point along the track). In one embodiment, one connection point may be on a building or wall, while a second connection point may be on a tower or pole. The connection points should be high enough to suspend the wire at a sufficient height above the ground so as to not to interfere with any vehicle or operation in the facility. This arrangement also prevents the wire or anything thereon from being easily accessed by a person on the ground.

Wires may be removably attached to a connection point by means known in the art, thereby allowing quick detaching of the wire for painting or repairs, or movement of the wire from one connection point to another. A single wire may extend between two connection points, or may extend between multiple connection points (i.e., from an end point to one or more intermediate connection points to another end point).

In several embodiments, a motorized trolley is mounted on each wire, and moves along the wire in either direction by remote control (through wired or wireless communications). A trolley can be stopped at any point and locked into place on the wire. Multiple trolleys may be mounted on a single wire.

In various embodiments, a trolley supports a wireless access point device/antenna, so the various devices/antennae can be moved to various locations in the facility, including being suspended at points over a vehicle lot, to ensure optimal wireless coverage of the facility with the strongest possible wireless signals throughout. The device/antenna may be mounted along or on the trolley, or be suspended therefrom. The device/antenna also may controlled remotely, so the device/antenna can be rotated, turned, or raised up or down as needed.

Similarly, a trolley may support a remote-operated camera (mounted along or on the trolley, or suspended therefrom), which can be rotated, turned, or moved up and down as needed to provide security monitoring for the facility. Video and/or pictures may be recorded and stored locally (on a storage device in the camera), or transmitted and stored remotely. Storage may be for a pre-established period of time.

A single trolley may support one or more WAP devices/antennae, one or more security cameras, or combinations thereof. A single wire or section of wire may support one or more trolleys.

In several embodiments, the present system coordinates with connected user data in a reservations or customer database, which is accessed over a network. In some embodiments, the customer may select active monitoring by the system by using an application on the customer's mobile device, whereupon the customer reservation information, including, at least, arrival time and vehicle location, is sent to the facility security system. When the customer arrives at the facility, the security cameras can automatically follow and monitor the customer to the vehicle, moving one or more cameras along the corresponding wires, as necessary, and then follow the vehicle as the customer drives it off the lot. Alternatively, the system may be alerted to a customer leaving the counter in the facility, and then follow the customer and vehicle from that point to the vehicle and exit.

The system also may detect, or be informed of, a vehicle being returned to the facility, and then automatically follow the vehicle to the return location within the facility, and then follow the user until they leave the facility.

In several further embodiments, the present invention comprises a laser-driven display projector, which can be removably mounted on a wall or vertical structure, or suspended from a ceiling or roof. The display projector projects the names and reserved vehicle locations (as described above) on a wall, white board, or similar vertical surface. The information is transmitted to the display projector by wired or wireless electronic communications, and can be easily changed or updated remotely. The projector can be easily and more cheaply installed, repaired, replaced, or removed than the display boards currently in use.

DETAILED DESCRIPTION OF EXEMPLARY EMBODIMENTS

Figure 1:
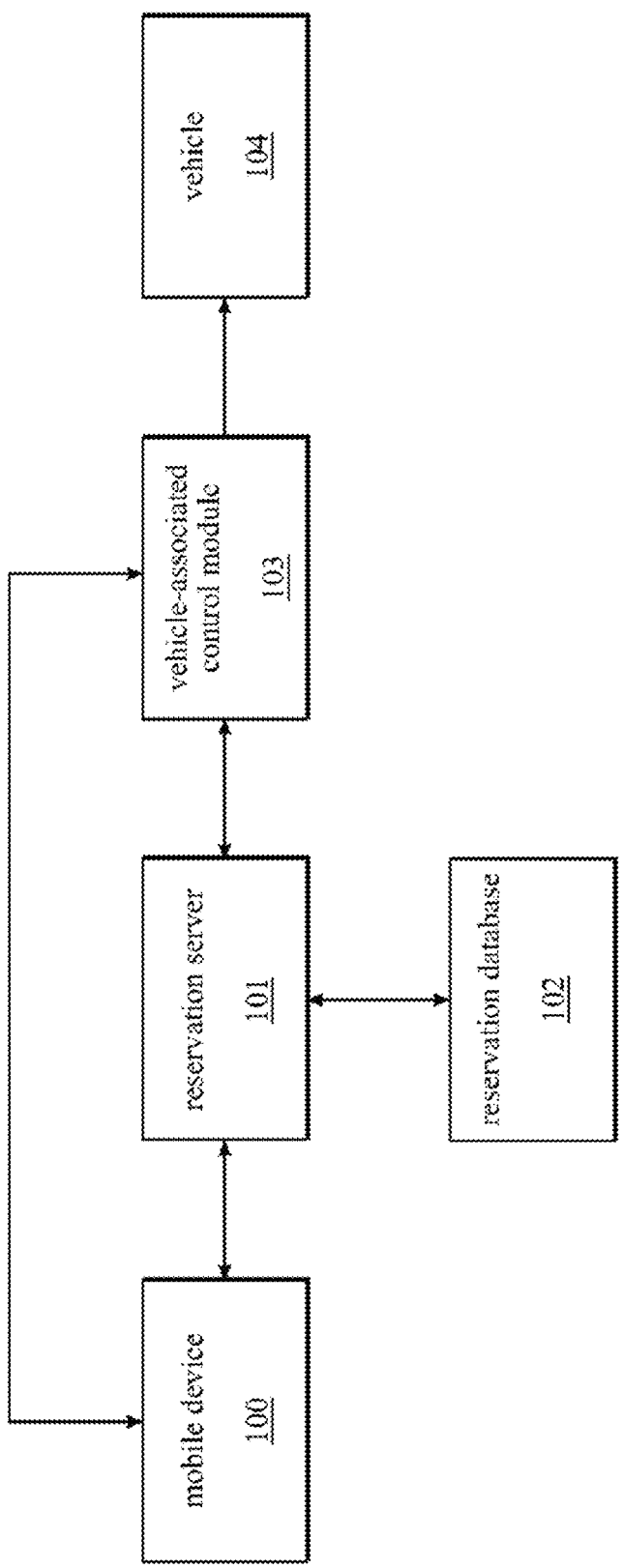
FIG. 1 illustrates the system architecture of a mobile device used to communicate with a vehicle and reservation server of a connected fleet.

In various exemplary embodiments, the present invention comprises a system and related methods for management of communications and interactions between a user and a connected fleet of vehicles. A "connected fleet" comprises a plurality of vehicles, some or all equipped with (i) on-board sensors and computer systems for monitoring and capturing the operational status and performance of vehicle systems and components, and (ii) one or more electronic control and/or communications units for two-way or multiple pathway communication with one or more fleet management servers or networks, outside data centers or sources, other vehicles, and individual user or driver computing devices. A "connected user" comprises a user with one or more computing devices, including, but not limited to, mobile computing devices such as smart phones, tablets, or wearable devices, that provide extended, continuous, uninterrupted electronic communications with various computer networks, devices, and systems, including, but not limited to, elements of the connected fleet computing system or network, regardless of where the user is and how they are connected. Connected users may include, but are not limited to, drivers, passengers, customers, renters, members of a vehicle sharing service, employees, owners, or operators.

Vehicles in a connected fleet may include, but are not limited to, automobiles, trucks, vans, buses, motorcycles, bicycles, mopeds, construction and utility vehicles, battery-powered carts, golf carts, airplanes, aircraft, boats, watercraft, and the like. Vehicles may be controlled by a driver or user, or autonomous or semi-autonomous. A fleet may include, but is not limited to, a rental vehicle fleet, shared vehicle fleet, peer-to-peer or business-to-business transportation fleet, taxi-cab fleet, corporate vehicle fleet, municipal or governmental agency vehicle fleet, bus fleet, utility or construction vehicle fleet, truck fleet, or combinations thereof. A fleet may be homogenous or heterogeneous (i.e., a mixed fleet). Fleets may be combined to make larger fleets, and fleets may also be sub-divided into component fleets by various parameters (e.g., type of use, type of customer or user, country, state, city, county, or other defined geographical area). The term "fleet" as used herein includes fleets of all types and various combinations, components or sub-divisions thereof.

As described in detail below, in several embodiments the present invention comprises a unique, single integrated platform for communications between a connected user and a connected fleet management system. The connected fleet management system manages fleet planning, in-fleeting operations, vehicle acquisition and provisioning, vehicle assignment, vehicle transfers (i.e., to another fleet or another component fleet in the larger fleet), vehicle use operations (i.e., reservations, use and return by a customer, member, driver or user), vehicle servicing, vehicle maintenance and repairs, and de-fleeting operations (e.g., removal of the vehicle from the fleet, return to manufacturer, or sale to third parties).

Within this context, the system provides a variety of user-facing applications and interfaces, including applications which may be installed and run on a mobile computing device of the user for various functions. These functions include, but are not limited to, user registration or enrollment, user reservation management, user access to a fleet vehicle, communication between the user and the fleet management system during use (including, but not limited to, providing roadside or emergency assistance), and return of the fleet vehicle.

In several exemplary embodiments, the present invention comprises one or more systems or applications for enrolling or registering users. Types of users vary depending on the nature of the fleet. For example, users may be employees of the owner of a corporate or municipal utility fleet, authorized drivers of a bus fleet, drivers of taxi-cabs, renters or customers of a car rental agency, or members of a car sharing service. Accordingly, the types of user registration or enrollment system will vary as well.

In general, the user enrollment or registration component collects necessary information from the users, and reviews potential users backgrounds and qualifications, including, but not limited to, user training, licensure reviews, background checks, and credit checks, as appropriate. In some business models, enrollment may comprise an application and acceptance as a member of a car sharing or similar service. Advertising or other means of solicitation of potential users may be included. In some cases, users may not be previously enrolled prior to an initial reservation or use, and some or all of these checks may be performed at the time the user reserves a vehicle or initially takes possession of a vehicle.

Users of a particular fleet may be divided into different categories or classifications (e.g., a preferred or frequent driver program for a car rental company, or users licensed for certain types of vehicles). In several embodiments, the system may comprise a "trusted user" program, where the user has meet certain pre-qualifications and undergone substantive background and credit checks. A "trusted user" may receive certain advantage and perquisites, such as access to special vehicles, quicker and easier access to vehicles, and quicker and easier returns.

In several embodiments, the present invention further comprises one or more reservation systems or applications. These comprise both user-facing and internal fleet system elements. An example of a multi-tiered fleet management reservations database caching system is described in U.S. Pat. No. 9,576,254 (issued Feb. 21, 2017 to Zipcar, Inc.), which is incorporated herein by specific reference for all purposes. Examples of a reservations interface for a user to identify available vehicles and make a reservation are provided in U.S. Pub. No. 2013/0226633 (published Aug. 29, 2013 by Zipcar, Inc.) and U.S. Pub. No. 2011/0060480 (published Mar. 10, 2011 by Zipcar, Inc.), which are incorporated herein by specific reference for all purposes.

Figure 2:
FIG. 2 illustrates a portion of a mobile device user interface displaying a map of vehicle locations
Figure 3:
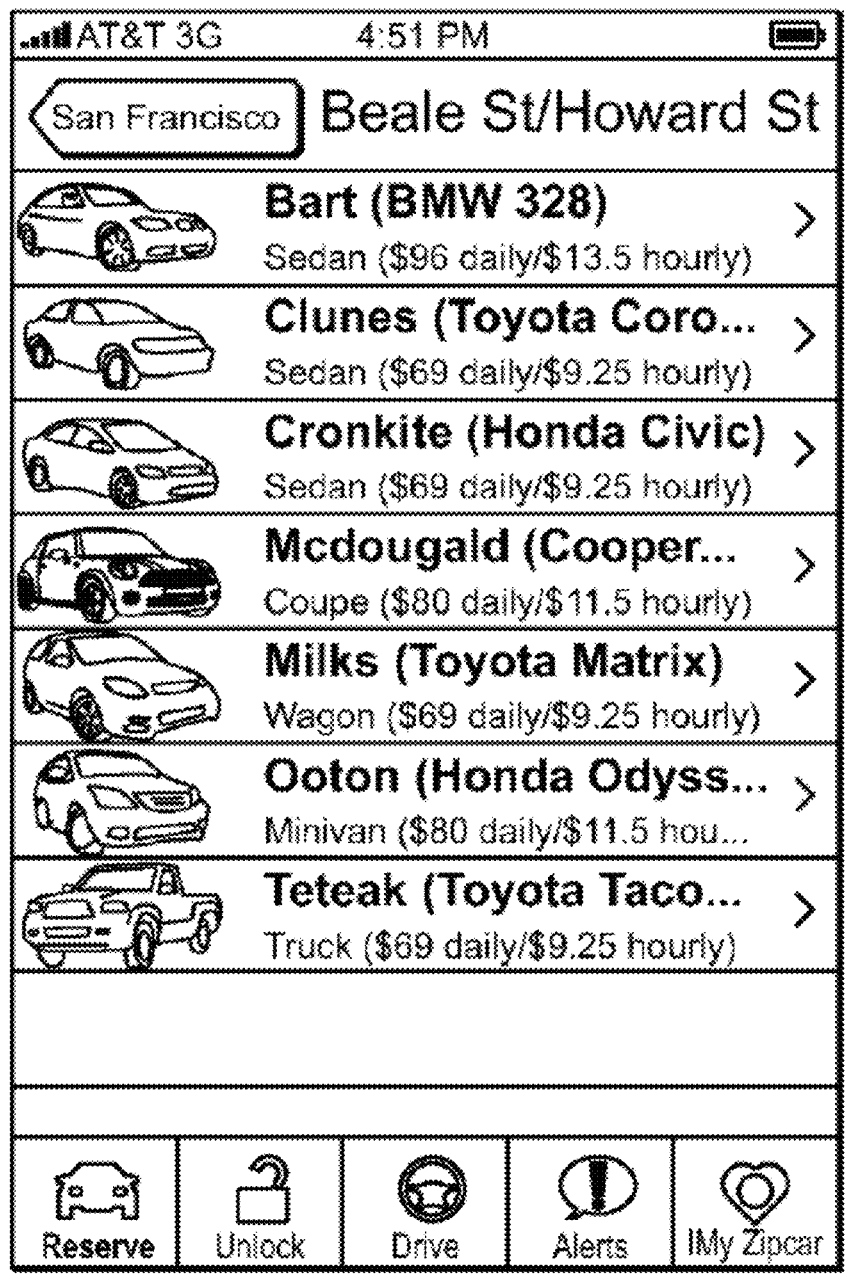
FIG. 3 illustrates a portion of a mobile device user interface displaying information regarding the vehicles available at a selected location.
Figure 4:
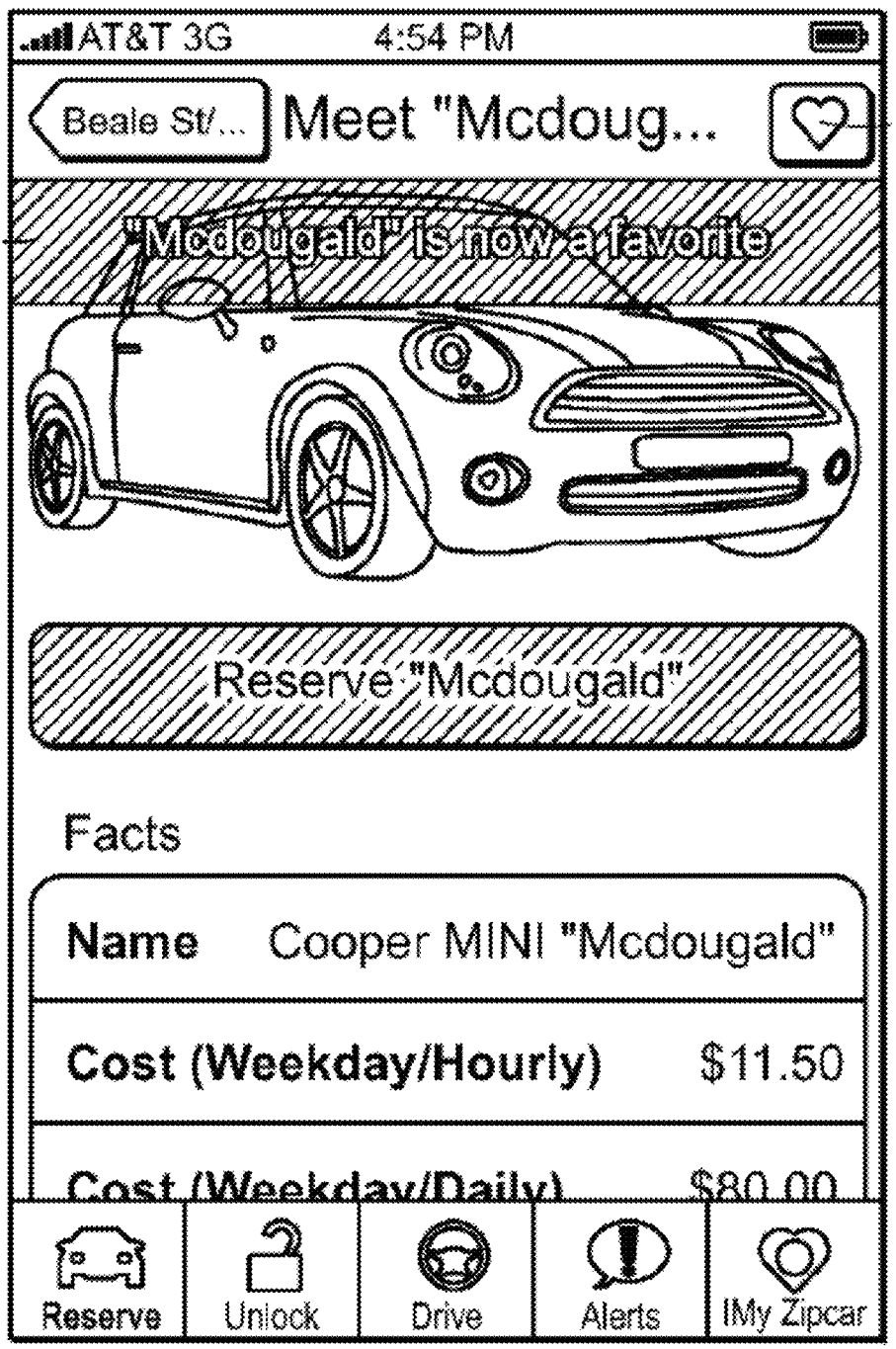
FIG. 4 illustrates a portion of a mobile device user interface for selecting a "favorite" vehicle or vehicle type.

In one exemplary embodiment, for example, as seen in FIG. 1, a mobile device 100 runs a mobile device application for reserving and accessing a reservable asset, such as a vehicle 104. The mobile device application can be installed on the mobile device or it can be accessed through a web application. The mobile device electronically communications with a reservation server 101 that is part of a connected fleet management system. The reservation server is in communication with a reservation database 102. The reservation server provides information about reservable vehicles to the mobile device, including reservable assets (typically for a requested time period and location of interest). The mobile device application may display a map of locations of reservable vehicles, enabling users to search and view locations as desired, as seen in FIG. 2. The mobile device application also may display reservable vehicles in list format, as seen in FIG. 3. Users may mark certain vehicle types, or specific vehicles, as a "favorite," as seen in FIG. 4, for facilitating future searches.

The present invention further comprises a vehicle access component, that also may comprise both user-facing and internal fleet system elements. This may be part of the reservations system or work in conjunction with a reservations system. The user seeks access in a variety of ways, including, but not limited to, obtaining keys to the vehicle from a car rental agent, presenting an authorized user card to a card reader in the vehicle, or using a mobile computing device to communicate with a TCU or dedicated access unit in the vehicle, as discussed above. Examples of access control systems are disclosed in U.S. Pat. No. 9,442,888 (issued Sep. 13, 2016 to Zipcar, Inc.) and U.S. Pat. No. 9,635,518 (issued Apr. 25, 2017 to Avis Budget Car Rental, LLC), which are incorporated herein by specific reference for all purposes.

In cases where the user is attempting key-less access to a connected vehicle, such as by wireless communication with a user's mobile computing device, there are several methods to determine whether to allow access. In some cases, access may be permitted if the user is a pre-authorized registered user, and presents a general access code or authorization to the vehicle. In other cases, reservation data (either for a single reservation or for reservations over a period of time, which can be a day or several days) has been previously electronically communicated to the vehicle (e.g., transmitted to a TCU in the vehicle) and stored therein, and access is permitted if a user attempting access matches corresponding reservation data (i.e., user identity, time period, and the like). Alternatively, after receiving an access request from a user, the vehicle (i.e., through TCU or similar unit) electronically communicates with the fleet management system to confirm whether or not to allow access. In cases where the vehicle cannot establish direct communication access, it may attempt to establish communication through other connected vehicles, through the user's mobile device, or other wireless access points.

In some cases, such as an underground garage or parking area, the vehicle and user's computing device may be unable to establish outside communications links in any fashion. In several embodiments, the fleet management system of the present invention previously provides a protected, secure, single-use token to the user's computing device upon making a reservation (or close to the starting time of the reservation), which is then securely communicated to the vehicle by the user's computing device through local wireless communications means (e.g., BLE, NFC, and the like). The vehicle processes the token, and allows access if the information in the token is valid.

After access is allowed, the period of use commences. During use, as described above, the connected vehicle (or a TCU or a similar unit in the vehicle) provides various information to the fleet management system. The fleet management system may directly or indirectly monitor some or all of the period of use.

In several embodiments, the fleet management system monitors the period of use for emergency situations, which may be reported by the user through an application on the user's mobile device or a unit in the vehicle. The user can establish connection directly with the fleet management system or an road-side assistance or emergency response team or service, and request assistance.

In several embodiments, the user may communicate an incident or accident in real-time or near real-time during the use period. Information may be gathered in real time by the user using the application on their mobile computing device, including descriptions and pictures of any damage to the vehicle. This information can then be provided to the fleet management system's servicing or maintenance components for advance planning and scheduling prior to return of the vehicle.

The user may be contacted if the fleet management system detects that the vehicle may be returned late, or at a different location than identified in the reservation, as described in U.S. Pub. No. 2013/0246102 (published Sep. 19, 2013 by Zipcar, Inc.) which is incorporated herein by specific reference for all purposes. The fleet management system can assist the user in extending or modifying the reservation if necessary, and may contact other users that may be affected by the late return.

The present invention further comprises vehicle return applications or components, which handle, among other things, determination of the vehicle status and condition, invoicing of the user (where appropriate), and forwarding of the vehicle for any servicing, maintenance, or repairs that may be required. These also may comprise user-facing and internal fleet elements. For example, a user may return a vehicle to a planned drop-off location, then automatically check-in through an application on their mobile computing device. The user may be prompted to confirm mileage and gas levels (which the connected vehicle may communicate directly to the fleet management system), and electronically sign the final invoice. An electronic receipt may be sent to the user through the application, email, or other form of electronic communication.

Figure 5:
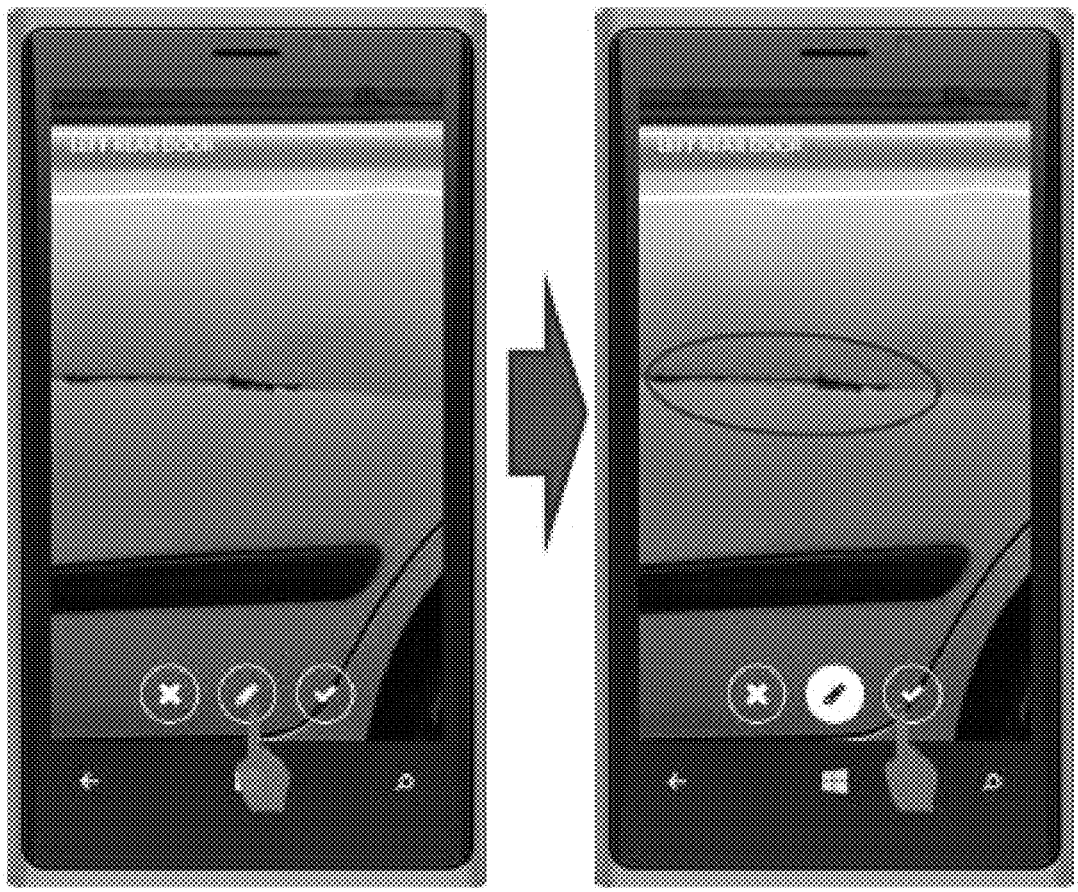
FIG. 5 illustrates a mobile device user interface for recording damage to a vehicle.
Figure 6:
FIG. 6 illustrates a mobile device user interface for reviewing and electronically signing an invoice.

If the vehicle is damaged, the application may be used to record/photograph the damage, as seen in FIG. 5, and the system may then automatically, in real time, calculate a damage charge to add to the user invoice at the time of return. The mobile device may be used to capture the electronic signature of the customer or user returning the vehicle, as seen in FIG. 6, including the damage charge.

Mobile Security and Wireless Access Point Device

For many fleet vehicle rental or sharing services, the rental facilities often are located in leased space and lots, which change over time. Permanent installation of wireless access point devices and antennae around a facility, particularly around the lot where vehicles are parked and access is provided to customers, is expensive. In addition, repainting or reconfiguration of a lot or facility incurs a high cost in removal and reinstallation of the device/antennae system. The same is true for the permanent installation of security cameras in the same areas.

Figure 7:
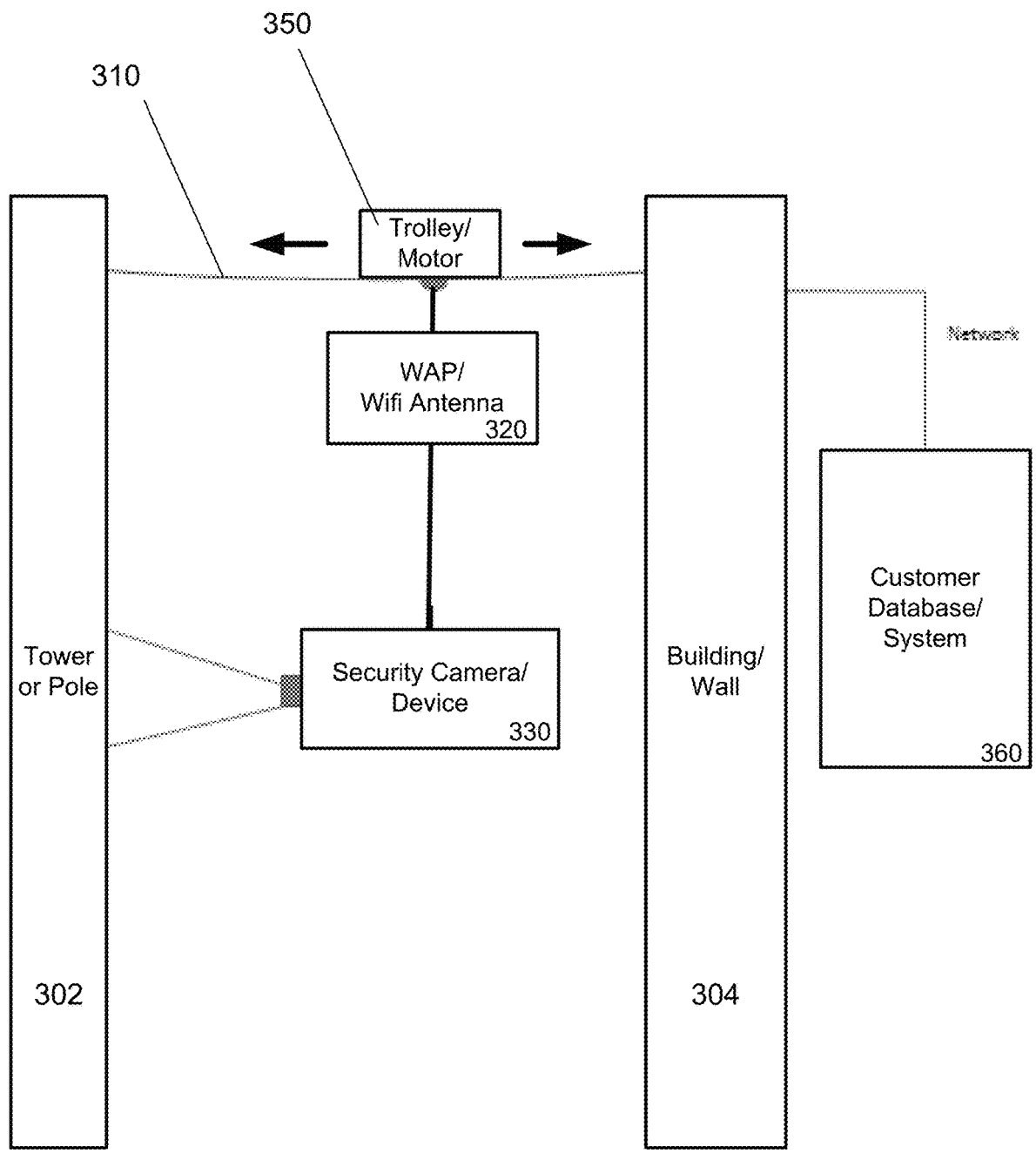
FIG. 7 shows a diagram of a mobile wireless access point and security system.

In several embodiments, the present invention comprises a system for the easy and rapid movement of wire access point devices/antennae, security cameras, or both, within the facility, as seen in FIG. 7. The system comprises one or more support wires 310, each wire extending between connection points 302, 304 within the facility. The connection points may be fixed or moving (i.e., the connection point itself may be on a track or similar device, and thus be movable from point to point along the track). In one embodiment, one connection point may be on a building or wall 304, while a second connection point may be on a tower or pole 302. The connection points should be high enough to suspend the wire at a sufficient height above the ground so as to not to interfere with any vehicle or operation in the facility. This arrangement also prevents the wire or anything thereon from being easily accessed by a person on the ground.

Wires 310 may be removably attached to a connection point 302, 304 by means known in the art, thereby allowing quick detaching of the wire for painting or repairs, or movement of the wire from one connection point to another. A single wire may extend between two connection points, or may extend between multiple connection points (i.e., from an end point to one or more intermediate connection points to another end point). In several embodiments, the wires are not electronic or telephone wires.

In several embodiments, a motorized support or trolley 350 is mounted on each wire, and moves along the wire in either direction by remote control (through wired or wireless communications). A trolley can be stopped at any point and locked into place on the wire. Multiple trolleys may be mounted on a single wire.

In various embodiments, a trolley 350 supports a wireless access point device/antenna 320, so the various devices/antennae can be moved to various locations in the facility, including being suspended at points over a vehicle lot, to ensure optimal wireless coverage of the facility with the strongest possible wireless signals throughout. The device/antenna may be mounted along, in or on the trolley, or be suspended therefrom. The device/antenna also may controlled remotely, so the device/antenna can be rotated, turned, or raised up or down as needed. The device/antenna may be connected to the network by wired or wireless communications.

Similarly, a trolley may support a remote-operated security camera or device 330 (mounted along or on the trolley, or suspended therefrom), which can be rotated, turned, or moved up and down as needed to provide security monitoring for the facility. Video and/or pictures may be recorded and stored locally (on a storage device in the camera), or transmitted and stored remotely on a network device. Storage may be for a pre-established period of time.

A single trolley may support one or more WAP devices/antennae, one or more security cameras, or combinations thereof. A single wire or section of wire may support one or more trolleys.

In several embodiments, the present system coordinates with connected user data in a reservations or customer database 360, which is accessed over a network. In some embodiments, the customer may select active monitoring by the system by using an application on the customer's mobile device, whereupon the customer reservation information, including, at least, arrival time and vehicle location, is sent to the facility security system. When the customer arrives at the facility, the security cameras can automatically follow and monitor the customer to the vehicle, moving one or more cameras along the corresponding wires, as necessary, and then follow the vehicle as the customer drives it off the lot. Alternatively, the system may be alerted to a customer leaving the counter in the facility, and then follow the customer and vehicle from that point to the vehicle and exit.

The system also may detect, or be informed of, a vehicle being returned to the facility, and then automatically follow the vehicle to the return location within the facility, and then follow the user until they leave the facility.

Laser Display Board

As discussed above, for many fleet vehicle rental or sharing services the rental facilities often are located in leased space and lots, which change from time to time. Such facilities typically have a LCD or plasma display board for displaying the names of VIP or similar customers who have reserved a vehicle and the reserved vehicle location (thereby allowing the customer to bypass the facility counter and proceed directly to the vehicle) permanently installed. The installation and removal of these boards is expensive, as is their repair and replacement.

Figure 8:
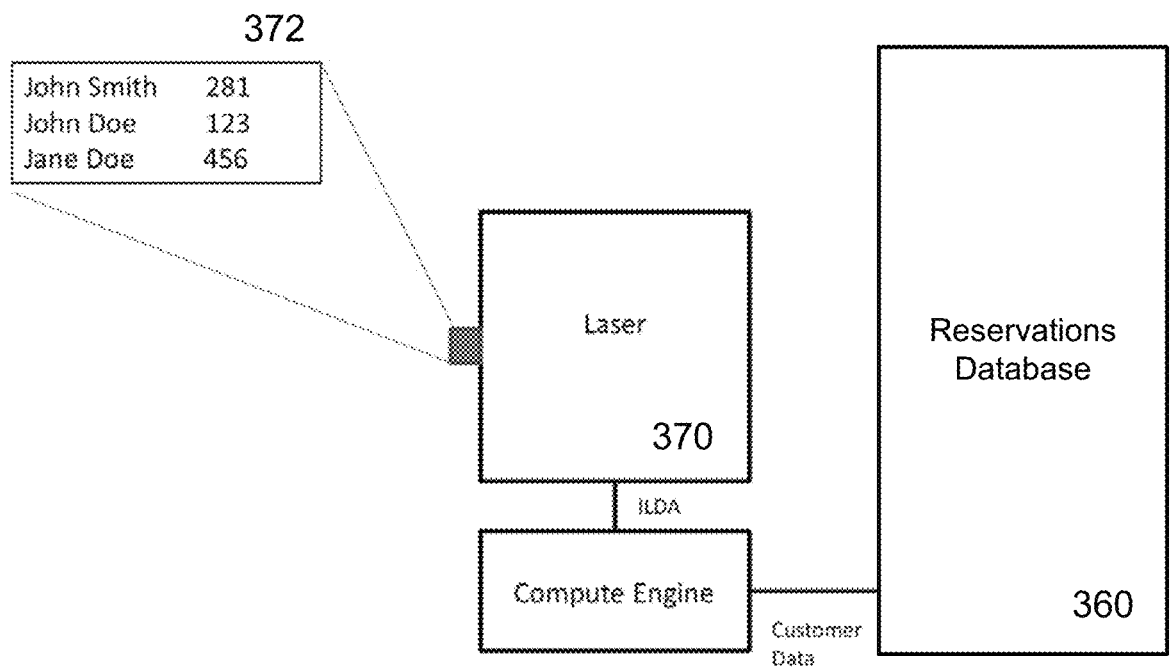
FIG. 8 shows a diagram of a laser-generated projected display system.

In several embodiments, as seen in FIG. 8, the present invention comprises a laser-driven display projector 370, which can be removably mounted on a wall or vertical structure, or suspended from a ceiling or roof. The display projector projects the names and reserved vehicle locations 372 (as described above) on a wall, white board, or similar vertical surface. The information is transmitted to the display projector by wired or wireless electronic communications, and can be easily changed or updated remotely. The projector can be easily and more cheaply installed, repaired, replaced, or removed than the display boards currently in use.

Connected Fleet Interaction

More detailed information about interactions between connected users and a connected fleet management system (including various applications and interfaces), and examples thereof, are disclosed in the co-pending application entitled "Connected Fleet Management System," a copy of which is attached hereto as an appendix and incorporated herein by specific reference for all purposes.

Computer Implementation

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions, and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infra-red, or the like), or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

As used herein, the singular forms "a," "an" and "the" include plural referents unless the context clearly dictates otherwise. Further, the terms "additional", "optional", "optionally", "may" and the like mean that the subsequently described operation, event or functionality mayor may not be required, and that the description includes instances where said operation, event or functionality occurs and instances where it does not. The word "comprise" and variations of that word, and the word "include" and variations of that word, mean "including but not limited to," and are not intended to exclude, for example, other components, steps, or operations. "For example" and "exemplary" mean "an example of" and are not intended to convey an ideal embodiment.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. The system, methods and apparatus of the present invention are not limited to specific components, network connections, or arrangements described and disclosed herein, as such may vary. It is also to be understood that the terminology used herein is for the purpose of describing particular embodiments only, and is not intended to be limiting. Even though specific embodiments of this invention have been described, they are not to be taken as exhaustive. There are several variations that will be apparent to those skilled in the art.

What is claimed is:

1. A system for providing wireless network access and security in a connected fleet facility, comprising:
    a plurality of support wires suspended above a facility lot at a sufficient height so as not to interfere with any vehicle or operations in the facility; and
    a plurality of remotely-controlled motorized supports mounted on said support wires, wherein each of said plurality of motorized supports is adapted to move along a corresponding one of said support wires, and be stopped and locked into place at any point thereon;
    each motorized support supporting at least one wireless access point device or antenna in electronic communication with a wireless network;
    one or more of said motorized supports further supporting at least one remote-controlled security camera configured to be rotated, turned, and/or moved to record video and/or pictures of areas in or adjacent to the facility;
    wherein the plurality of motorized supports when stopped and locked are positioned to ensure optimal wireless network coverage in the facility; and
    wherein at least one of said one or more of motorized supports with at least one remote-control security camera automatically follows and monitors a customer moving to and entering a vehicle in the facility.

2. The system of claim 1, wherein the motorized support is a motorized trolley.

3. The system of claim 1, wherein the motorized trolley comprises one or more wheels.

4. The system of claim 1, wherein the motorized support with at least one-remote control security camera automatically continues following the customer and vehicle as they drive through and exit the facility.

5. The system of claim 4, wherein the plurality of motorized supports are configured to move along the corresponding support wire to various positions within a facility to provide a wireless network therein.

6. The system of claim 5, wherein the wireless network is adjustable by movement of one or more of said motorized supports with accompanying wireless access point devices or antennas along said support wires.

7. The system of claim 1, wherein one or more support wires support two or more motorized supports.

8. The system of claim 1, wherein each support wire comprises a first end point and a second end point.

9. The system of claim 8, wherein one or both of the end points are removably attached to a structural support by a connector.

10. The system of claim 9, wherein the structural support is a wall, a pole, or a tower.

11. The system of claim 1, further comprising at least one security camera support by one or more of said motorized supports.

12. The system of claim 1, wherein the motorized support is integrated with said at least one wireless access point device or antenna.

* * * * *